United States Patent [19]

Tsuchiya et al.

[11] 3,957,736

[45] May 18, 1976

[54] PROCESS FOR THE PREPARATION OF A RESIN

[75] Inventors: Shozo Tsuchiya, Kawasaki; Hideo Hayashi; Hisatake Sato, both of Yokohama, all of Japan

[73] Assignee: Nippon Oil Company Ltd., Tokyo, Japan

[22] Filed: Mar. 18, 1974

[21] Appl. No.: 452,255

[30] Foreign Application Priority Data

Mar. 26, 1973 Japan.............................. 48-33455

[52] U.S. Cl.............................. 526/11.1; 106/20; 526/72; 526/271; 526/272; 526/291; 526/295
[51] Int. Cl.$^2$....................... C08F 2/02; C08F 2/06; C08F 220/06; C08F 232/06
[58] Field of Search....... 260/78.5 BB, 80.7, 86.1 R, 260/86.3, 83.5

[56] References Cited

UNITED STATES PATENTS

| | | | |
|---|---|---|---|
| 3,306,868 | 2/1967 | Adrian.............................. | 260/23.7 |
| 3,342,787 | 9/1967 | Muskat.............................. | 260/78.5 |
| 3,563,937 | 2/1971 | Nickerson.......................... | 260/33.4 |
| 3,775,381 | 11/1973 | Hayashi et al................. | 260/78.4 D |

*Primary Examiner*—John Kight, III
*Attorney, Agent, or Firm*—Sherman & Shalloway

[57] ABSTRACT

A process for preparing a thermoplastic resin containing polar groups and unsaturated bonds which comprises reacting (A) five-membered cyclic compounds containing unsaturated conjugate double bonds, (B) unsaturated carboxylic acids or the anhydrides thereof and (C) monohydric saturated or unsaturated alcohols in a specified molar ratio.

13 Claims, No Drawings

PROCESS FOR THE PREPARATION OF A RESIN

This invention relates to a process for preparing a thermoplastic resin containing unsaturated bonds and polar groups. More particularly, the invention relates to a process for preparing a new thermoplastic resin containing unsaturated bonds and polar groups which is characterized by reacting a three-component mixture consisting of a five-membered cyclic compound containing a conjugate double bond or a Diels-Alder adduct thereof, an unsaturated carboxylic acid or an anhydride thereof, and a monohydric alcohol.

The natural and synthetic thermoplastic resins containing polar groups such as rosin, alkylphenol resins, rosin-modified phenolic resins, maleic acid resins and modified petroleum resins have been used hitherto in surface coatings, tackifiers and fillers of coating materials and printing inks, and each has its special characteristics. The present invention is directed to a process for preparing a new resin which differs completely from these conventional resins. While the resin prepared by the present invention is used in the surface coatings, tackifiers and various fillers of coating materials and printing inks, it is a new resin especially suitable as a resin for use with printing inks, and inter alia printing ink for offset printing.

As varnishes for printing inks, resinous varnishes prepared by dissolving a resin such as alkylphenol resins, rosin-modified phenolic resins and maleic acid resins in a drying oil such as linseed oil are being used in most cases at the present, the most widely used being the rosin-modified phenolic resins. However, while the printing ink vehicle consisting of a rosin-modified phenolic resin and a solvent and/or a drying oil excels in its quality, it has such drawbacks as that its supply is unstable due to the rosin being a natural product and also that its price is high. On the other hand, while the so-called petroleum resins that are obtained by polymerizing the cracked oil fraction obtained in great quantities as a by-product in the petroleum or petrochemical industry have the advantage in that their supply and price are stable, their quality is not satisfactory, and a resin possessing properties sufficient to make them usable as a resin for printing ink has not been obtained from petroleum resins in most cases.

The fundamental properties that are required in the case of printing inks, and especially ink for offset use, are as follows:
1. That the values indicating fluid properties such viscosity and yield are suitable.
2. That for forming a line of demarcation on a plane whereon water and ink are adjacent each other, an interfacial balance is maintained between the water retained portion and the inked portion.
3. That pigment dispersibility is good.
4. That the luster of the printed surface is satisfactory, and uniformly printed matter is obtained;
5. That the setting and drying times are short, and blocking is not set up.
6. That the resistance to rubbing of the printed surface is good.

In order to meet the foregoing properties required of an offset ink, the resin to be used therefor must satisfy the following requirements as to its properties.
1. It must have a high softening point, and moreover its molecular weight must not be high.
2. It must contain polar groups having pigment dispersibility. (It must contain polar groups having good affinity for pigments).
3. It must be fully soluble in the lower aromatic-containing high boiling hydrocarbon solvents that are used in offset inks.
4. It must be fully soluble in such drying oils as linseed oil.

An object of this invention is to provide an inexpensive vehicle that is obtainable from a starting material that can be obtained in large quantities and low cost from the petrochemical industry, which inexpensive vehicle possessing the various properties required of printing inks, and especially offset ink, can be substituted for the rosin-modified phenolic resin vehicle.

Thus, the present invention is directed to a process for preparing a thermoplastic resin containing unsaturated bonds and polar groups, the process being characterized by reacting in the presence or absence of an inert solvent a three-component mixture consisting of (A) at least one compound selected from the group consisting of five-membered cyclic compounds containing an unsaturated conjugate double bond and the Diels-Alder adducts thereof, (B) 0.01–0.5 mol per each mol of (A) [the mols of (A) being calculated on the basis of the five-membered ring] of an unsaturated carboxylic acid or an anhydride thereof, and (C) 0.1–1.0 mol, based on each equivalent of the carboxyl groups of (B), or 0.2–2.0 mols, based on each equivalent of the anhydride groups when (B) is an anhydride, of a monohydric saturated or unsaturated alcohol.

It has been known that when dicyclopentadiene is heat polymerized at an elevated temperature of 250°–350°C. in the presence of an inert hydrocarbon solvent such as benzene, toluene, xylene and isooctane, a resin soluble in such hydrocarbon solvents as benzene, toluene, xylene, cyclohexane and isooctane is obtained (U.S. Pat. No. 3,084,147). The resin obtained in this manner is soluble in such hydrocarbon solvents as benzene, toluene, xylene, and solvent naphtha. However, as this dicyclopentadiene resin does not possess any polar groups, its miscibility with the various substances and its tackiness are poor, with the consequence that it cannot be effectively used for various purposes. Again, in the case of an ink prepared by adding the various solvents and pigments to this resin, as hereinafter shown by means of the control experiments, the dispersibility between the resin and pigment is poor, the printed surface is nonuniform, and the adhesion of the ink and the luster thereof are poor. Hence, it is impossible to use this resin for preparing an offset ink.

Again, an attempt has been made to prepare a resin for printing ink by the addition, say, of acrylic esters or maleic anhydride to the aforesaid dicyclopentadiene followed by hyrolyzing the resulting adduct to obtain a carboxylic acid-containing resin, which is then reacted with a polyhydric alcohol and a higher unsaturated fatty acid. However, when the softening point of this base resin is raised in order to obtain an offset ink having setting and drying times at the time of printing comparable to those of the conventional inks, the solubility in the petroleum hyrocarbon solvents, the solvents for offset ink, becomes poor, with the consequence that the fluidity of the ink suffers, and the luster shows an extreme decline. Further, gelling and clouding appear at the time of preparation of the varnish, and the color is also poor. Rather than raising the softening point, it is necessary to lower the softening point of this resin for enhancing the solubility of the resin in the ink solvent, but in this case the setting and drying times are retarded, with the consequence that the resulting ink is of no practical use.

A resin obtained by heat-copolymerizing cyclopentadiene with maleic anhydride is also known, but in the case of this resin its usual softening point becomes objectionably high when the amount of maleic anhydride is reduced. Further, the dispersibility of pigments and miscibility with the other fillers is poor in the case of this resin. When the amount of the maleic anhydride is increased for compensating for the foregoing deficiencies, discoloration and gelling tend to take place, and again the weatherability of the resin suffers.

Also known is a method of preparing a resin for ink use by the socalled alkyd recipe. According to this method, a resin obtained by heat-polymerizing dicyclopentadiene with maleic anhydride is used as the polybasic acid component, which component is then reacted with a polyhydric alcohol and a drying oil. However, the alkyd resin prepared in this manner is generally of high molecular weight, and its solubility in the high boiling hydrocarbon solvents and drying oils used for preparing inks is poor. Again, when an ink is prepared using this resin, not only the fluidity of the resulting ink is poor, but the luster of the matter printed with this ink is also inferior. Further, excessive misting is set up, and thus this resin is not suitable for practical use.

In contrast the present invention concerns a process for preparing a new resin which has solved the foregoing difficulties, the process being characterized by reacting a three-component mixture consisting of a five-membered cyclic compound containing conjugate double bonds or a Diels-Alder adduct thereof, an unsaturated carboxylic acid or an anhydride thereof, and a monohydric alcohol.

The process of the invention will now be more fully described below.

This invention uses as its first starting material a compound selected from five-membered cyclic compounds containing conjugate double bonds having the following formula

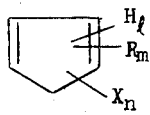

where R is an organic residue of 1–24 carbon atoms, X is halogen, $l$, $m$ and $n$ are integers with the proviso that $l + m + n = 6$, and the Diels-Alder adducts of said five-membered cyclic compound. The R, which is an organic residue of 1–24 carbon atoms, is a residue of hydrocarbon such as aliphatic, alicyclic and aromatic hydrocarbons. Those in which a hetero atom such as oxygen, nitrogen and sulfur has been introduced into these hydrocarbons can also be used, provided that these substituents do not set up an objectionable reaction with the other starting materials of this invention. X is a halogen such as fluorine, chlorine and bromine. $l$, $m$ and $n$ are each an integer, the total of which is 6. When $m$ and $n$ are 2 or more, R and X may be the same or different.

In the present invention the Diels-Alder adducts of these five-membered cyclic compounds can also be used. Preferably used in this invention are the compounds in which R is an alkyl group of 1–6 carbon atoms, $m$ is 0–2 and $n$ is 0 or 1, or the Diels-Alder adducts thereof, or the mixtures of these compounds.

Specifically, preferred for commercial use are such compounds as cyclopentadiene, monochlorocyclopentadiene, methylcyclopentadiene, dimethylcyclopentadiene, dicyclopentadiene, cyclopentadiene-methylcyclopentadiene codimer, tricyclopentadiene, and the mixtures of these compounds.

While the purity of the cyclopentadiene, dicyclopentadiene or the alkyl-substituted derivatives thereof need not necessarily be good, it is preferred that these compounds are present in an amount exceeding 80% by weight. For instance, it is also permissible to use a concentrated fraction obtained by heat-dimerizing the cyclopentadiene and methylcyclopentadiene contained in the $C_5$ fractions obtained as a by-product in cracking naphtha at elevated temperatures, to obtain a mixture of such compounds as dicyclopentadiene, dimethylcyclopentadiene, cyclopentadiene-methylcyclopentadiene codimer, cyclopentadiene-isoprene codimer, and cyclopentadiene-piperylene codimer, and thereafter removing a major portion of the $C_5$ fractions such as $C_5$ olefins and $C_5$ paraffins by distillation.

The unsaturated carboxylic acids or anhydrides thereof used in this invention are usually the mono- and polyunsaturated carboxylic acids of 3–32 carbon atoms and the anhydrides thereof. As typical examples of these compounds, included are acrylic acid, methacrylic acid, maleic acid, maleic anhydride, tetrahydrophthalic acid and its anhydride, fumaric acid, citraconic acid, itaconic acid, and mixtures of these compounds.

On the other hand, the monohydric saturated or unsaturated alcohols used in this invention are usually the natural or synthetic saturated or unsaturated monohyric alcohols of 1–24 carbon atoms, typical examples include methyl alcohol, ethyl alcohol, butyl alcohol, and the straight chain or branched alcohols such as heptanol, isodecanol and tridecanol synthesized by the oxo method or ziegler process, or mixtures of these alcohols, as well as the alcohol obtained by the reduction of coconut oil, oleyl alcohol obtained from sperm oil, or mixtures of these alcohols. In the present invention a higher monohydric saturated or unsaturated alcohol of 6–24 carbon atoms is preferably used in the case where a resin for printing inks, and especially offset inks, is to be prepared, since in this case the solubility in the high boiling hydrocarbon solvents of the resulting resin is enhanced.

There is no need to be too particular about the purity of this monohydric alcohol. In these alcohols, the admixture of hydrocarbons, oils, and fats in a small amount, which become trapped in the alchols during their preparation, can be tolerated.

As shown in the control experiments given hereinafter, when a polyhydric alcohol is used instead of a monohydric alcohol in this invention, not only the solubility in solvents of the resulting resin becomes poor, but also there are instances when a gel insoluble in solvents is formed so as to impair such properties as fluidity and luster of the ink prepared from such a resin, thus rendering the resin unsuitable for use as a resin for preparing an offset ink. However, when a small amount of a polyhydric alcohol is used in admixture with a monohydric alcohol, it becomes possible to adjust the softening point and molecular weight of the resin. Hence, it is possible to use the polyhydric alcohols in conjunction with the monohydric alcohols in an amount of the order so that gels insoluble in solvents are not formed. In this case, the polyhydric alcohol can be used in an amount of up to about 0.5 mol per mol of the monohydric alcohol. The polyhydric alcohol, as used herein, is an organic compound having at least two hydroxyl groups, typical examples being ethylene glycol, propylene glycol, pentaerythritol, etc.

The unsaturated carboxylic acids or the anhydrides thereof used in the present invention are used in an amount of 0.01–0.5 mol per mol of the five-membered cyclic compounds having unsaturated conjugate double bonds (per mol of the five-membered cyclic compound making up the adduct in the case where the Diels-Alder adducts are used).

Thus, one feature of the present invention is that the unsaturated carboxylic acids or their adducts can be used in a wide range relative to the five-membered cyclic compounds. For instance, even though 1.0 mol of the unsaturated carboxylic acid or acid anhydride is used with about 30–50 mols of the five-membered cyclic compound, neither does the softening point of the resulting resin become objectionably high nor is there any formation of a gel-like substance. When the transparency, acid value, demulsibility and softening point of the resulting resin are considered, the unsaturated carboxylic acid or its anhydride is preferably used in an amount ranging from 0.05 to 0.1 mol per mol of the five-memebered cyclic compound, calculated on the basis of the number of mols of the five-membered ring, and especially 0.05–0.07 mol in the case the resulting resin is to be used for preparing an offset ink. When the amount of the unsaturated carboxylic acid or the anhydride thereof is less than 0.01 mol, the amount of the polar groups of the resulting resin is small and, hence, the miscibility and dispersibility with pigments and other fillers become poor and at the same time the tackiness as well as fluidity are also unsatisfactory to render the resin undesirable, since it is devoid of the characteristics possessed by the resins containing the polar groups. This is especially true in the case where it is used for preparing inks, as the pigment dispersibility, ink fluidity and printing properties become poor.

On the other hand, when 0.5 mol is exceeded, this is also undesirable, since the amount of the polar groups become too great resulting in poor solubility of the resin in solvents. Again, there is a tendency for the resin to become discolored as well as gelation to take place. When the resin is to be used for ink preparation, there is the objection that the solubility in the hydrocarbon solvents becomes poor in preparing the varnish. Again, the fluidity of the ink as well as the luster of the matter printed with the resulting ink become poor.

The amount of the monohydric alcohol used in this invention ranges from 0.1 to 1.0 mol per equivalent of the carboxyl groups of the unsaturated carboxylic acid used, and in the case where an acid anhydride is used, the monohydric alcohol is used in an amount ranging from 0.2–2.0 mols per equivalent of the acid anhydride groups. When the amount of the alcohol used is less than the lower limit of the foregoing ranges, a resin which is satisfactory in its pigment dispersibility and solubility cannot be obtained. When such a resin is used for the preparation of ink, not only is its solubility in the ink solvent poor, but also the properties of the resulting ink are poor.

On the other hand, when the amount of the monohydric alcohol used exceeds the upper limit of the foregoing ranges, there is the objection that unreacted alcohol remains present in the reaction system. In the present invention, the use of 0.25–0.8 mol of the monohydric alcohol per equivalent of the carboxyl groups of (B), or 0.5–1.0 mol of the monohydric alcohol per equivalent of the acid anhydride groups of (B) is preferred.

In the process of the invention, a mixture of the aforesaid three components in the amounts hereinbefore prescribed is reacted in the presence or absence of a solvent. There is no particular restriction as to the solvent, and any can be used so long as it is an inert solvent that does not set up an objectionable reaction with the three starting components. As preferred solvents, there can be mentioned such inert solvents as the hydrocarbon solvents and halogenated hydrocarbon solvents. Specific examples include benzene, toluene, xylene, hexane, heptane, isoocatane and chlorobenzene.

The reaction is carried out under such conditions that the three starting components set up a reaction, and particularly a polymerization reaction, it being merely sufficient to heat the reactants at 150°–330°C., and preferably 240°–300°C., without a catalyst. In this case, the various catalysts such as radical catalysts also can be used. While the reaction time is imposed no particular restriction, about 10 minutes to 20 hours is suitable. After completion of the reaction, the solvent, unreacted components or lower polymers, when present, are separated and removed. While such means as aggregation, precipitation and centrifugation can be employed in the separation operation, separation by distillation is to be preferred. When the reaction is carried out in the absence of a solvent and the reaction has been caused to proceed fully until there are little or no unreacted components and lower polymers, the separation step, such as distillation, can be omitted after the reaction has been completed.

In preparing the resin in accordance with the process of this invention, the molecular weight and softening point of the resulting resin can be adjusted by a suitable choice of the combinations of the monomer concentration, reaction temperature and reaction time. The softening point of the resin prepared in this invention should preferably be at least 80°C. Although it is possible to prepare a resin having a high softening point, say, of above 200°C. by the invention process, this is not desirable because there is the drawback that the solubility of the resin in the ink solvents such as hydrocarbons or linseed oil is small and, at times, this results in insoluble portions being present in the product.

When the resin obtained in accordance with the invention process is to be applied to the preparation of ink, and especially offset ink, the softening point should preferably be 100°–160°C.

It is objectionable for the softening point of the resin to be lower than 80°C., because there is much misting, with the consequence that the drying speed is greatly retarded resulting in a tendency to set up.

In the reaction for forming the resin in the invention process, it is not exactly clear by what reaction mechanism the three starting components are reacted. However, as previously noted, from the fact that a very distinctive, valuable resin containing unsaturated bonds and polar groups is obtained and also the fact that the resin obtained by reacting the three components according to the present invention has an acid value differing from that of the resin obtained by the addition of an alcohol to the reaction product of a five-membered cyclic compound and an unsaturated carboxylic acid, as well as the fact that the solubility and color of the three-component reaction product of the invention are superior and also the fact that when the invention product is prepared into a varnish, the turbidity of the varnish is exceedingly small, it is hypothesized that the three components react in a complex and special manner to form the resin.

While the resin prepared by the invention process contains unsaturated bonds and polar groups and is used as obtained for surface coating agents such as paints and inks, tackifiers and various fillers, it is especially suitable for use in the preparation of printing inks such as gravure ink, offset ink, etc., and inter alia for the preparation of offset ink.

Especially, when the resin is to be used for offset or gravure ink, it can be made into a varnish by mixing it as obtained with the drying oils, semi-drying oils and solvents. Further, since the invention resin contains the polar groups and unsaturated bonds, it can be used for the various foregoing purposes after modification in the following manner: (i) hydrogenation of this resin; (ii) converting this resin into a so-called alkyd resin material by reacting it with either a polyhydric alcohol alone or a mixture of a polyhydric alcohol and a fatty acid and/or fats and oils; and (iii) reacting this resin with a phenol-formaldehyde condensation product.

The features of the invention process, and especially those relative to obtaining a resin for ink use, are enumerated below.

1. In preparing the resin for offset ink use, the so-called alkyd recipe that was usually considered to be necessary in the preparation of this type of resin need not be employed, and the varnish material for ink use can be obtained directly by reacting the three starting materials. Hence, the invention process is exceedingly advantageous from the commercial standpoint.

2. The resin obtained by the invention process, as a new resin for offset ink use, can be used alone for inks of various colors. It has printing effects and properties that are at least comparable to those of the hitherto-used rosin-modified phenolic resins or alkylphenol resins. Moreover, the invention resin can be produced at a lower cost than the rosin-modified phenolic resins.

3. As it is possible to prepare the offset ink with the same recipe and method of preparation as used in the case of conventional resins, there is no need to provide new equipment for preparing the ink. That is to say, the offset ink can be obtained by dissolving 100 parts of the invention resin in 0–150 parts of an oil such as a drying oil and 0–100 parts of a hydrocarbon solvent at room temperature or under heating to obtain a varnish whose viscosity is adjusted to about 500 poises at room temperature, followed by blending the varnish with a pigment, etc., and kneading, say, with a roll.

4. It can, if necessary, be used with the conventional resins.

5. Since the resin obtained is light in color, the reproducibility of the color tone is good regardless of what type of pigment is used. In addition, the color development is satisfactory.

6. The resin obtained by the invention process can not only be used for the preparation of offset ink but also for the preparation of gravure ink.

For a clearer understanding of the invention, the following specific examples are given. These examples are intended to be merely illustrative and not in limitation of the invention.

EXAMPLE 1

A 2-liter autoclave equipped with a stirrer was charged with 730 grams of dicyclopentadiene (DCPD) of 97% purity, 70 grams of maleic anhydride, 190 grams of oleyl alcohol and 300 grams of commercially available industrial mixed xylene, following which the mixture was reacted for 5 hours at a temperature of 270°–275°C. After completion of the reaction, the autoclave was cooled. This was followed by distilling the contents to remove the unreacted reactants, lower polymers and xylene to obtain a resin (I) having a softening point of 135°C. and an acid value of 21.

EXAMPLE 2

Five hundred grams of DCPD of 95% purity, 72 grams of acrylic acid, 145 grams of stearyl alcohol and 200 grams of isooctane were placed in an autoclave and reacted for 4 hours at 270°C. After completion of the reaction, the autoclave was cooled, and thereafter the contents were distilled to remove the unreacted reactants, lower polymers and isooctane to obtain a resin (II) having a softening point of 125°C. and an acid value of 18.

EXAMPLE 3

An autoclave was charged with 500 grams of DCPD of 95% purity, 230 grams of tetrahyrophthalic anhydride and 240 grams of isodecanol, and the reactants were reacted for 3 hours at 260°C. After completion of the reaction, the autoclave was cooled, and thereafter the contents were distilled to remove the unreacted reactants and the lower polymers to obtain a resin (III) having a softening point of 120°C. and an acid value of 16.

EXAMPLE 4

The C5 cracked oil fraction (boiling point 28°–60°C.) produced as a by-product in preparing ethylene and propylene by steam cracking of naphtha was heated for 4 hours at 120°C. to remove the $C_5$ fraction by distillation. The remainder contained 85% of DCPD and, in addition, the codimers of cyclopentadiene and isoprene. Five hundred grams of this fraction containing 85% of DCPD, 38 grams of maleic anhydride and 64 grams of myristyl alcohol were charged to an autoclave and reacted for 2 hours at 280°C. After completion of the reaction, the autoclave was cooled and thereafter the contents were distilled to obtain a resin (IV) having a softening point of 131°C. and an acid value of 20.

EXAMPLE 5

Five hundred grams of DCPD of 90% purity, 73 grams of maleic anhydride, 100 grams of stearyl alcohol and 5 grams of ethylene glycol were placed in an autoclave and reacted for 2 hours at 270°C. After completion of the reaction, the autoclave was cooled, after which the contents were distilled to obtain a resin (V) having a softening point of 140°C. and an acid value of 17.

EXAMPLE 6

An autoclave was charged with 700 grams of DCPD of 95% purity, 49 grams of maleic anhydride and 65 grams of 2-ethylhexanol, following which the mixture was reacted for 3 hours at 250°C. After completion of the reaction, the autoclave was cooled, and the contents were then distilled to obtain a resin (VI) having a softening point of 123°C. and an acid value of 20.

EXAMPLE 7

Seven hundred grams of DCPD of 95% purity, 150 grams of maleic anhydride and 150 grams of 2-ethylhexanol were placed in an autoclave and reacted for 4.5 hours at 250°C. After completion of the reaction, the autoclave was cooled, following which the contents were distilled to obtain a resin (VII) having a softening point of 125°C. and an acid value of 29.

CONTROL 1

Seven hundred grams of DCPD of 95% purity, 70 grams of maleic anhydride, 5 grams of oleyl alcohol and 300 grams of commercial mixed xylene were charged to an autoclave and reacted for 3.5 hours at 270°C. Following completion of the reaction, the autoclave was cooled, and the unreacted reactants, lower polymers and xylene were removed by distillation to obtain a resin having a softening point of 125°C. and an acid value of 37.

CONTROL 2

Seven hundred grams of DCPD of 95% purity, 70 grams of maleic anhydride and 300 grams of commercial mixed xylene were changed to an autoclave and reacted for 3 hours at 270°C. After completion of the reaction, the autoclave was cooled, and the contents were distilled to remove the unreacted reactants, lower polymers and xylene to obtain a resin having a softening point of 135°C. and an acid value of 55.

CONTROL 3

An autoclave was changed with 500 grams of DCPD of 97% purity, 70 grams of maleic anhydride, 95 grams of pentaerythritol and 200 grams of toluene, after which the mixture was reacted for 4 hours at 280°C. The reaction product being a gelled matter insoluble in organic solvents could not be prepared into an ink.

Next, the resins obtained in the foregoing Exaples 1–7 and Controls 1–2 were used to prepare varnishes having the composition described below, after which the so prepared varnishes were used to prepare the inks the properties of which were tested as hereinafter described.

Preparation of varnish.

The varnishes were prepared in the following manner. After adding 70 grams of linseed oil 100 grams of the product resin and heating the mixture for 2 hours at 230°C., 40 grams of a petroleum hydrocarbon solvent (specific gravity 0.852, aniline point 72.8, initial boiling point 272°C., end point 308°C.) was added followed by mixing the mixture intimately.

Preparation of ink.

The ink was prepared by kneading the following composition with a three-roll mill. The amount of the petroleum hydrocarbon solvent used was suitably adjusted to ensure that the SR value of the ink would become 17–18.

| | |
|---|---|
| Carmine 6B | 18 grams |
| Varnish | 67 grams |
| Solvent | 5 – 10 grams |
| Antifriction compound | 3 grams |
| Dryer for ink | 2 grams |

[Performance tests and results]

Luster:

Using an RI tester, 0.4 cc. of ink was applied to an art paper, left to stand for 24 hours and then measured with a 60°–60° glossmeter.

Setting time:

Using the foregoing RI tester, 0.4 cc. of ink was applied to an art paper, following which another art paper was laid over the coated paper, and while using the RI tester roller, the degree of adhesion of the ink to the overlaid paper was observed with the passage of time. The time required up to the point where the ink no longer adheres was thus measured.

Misting:

2.4 cc. of ink was placed on an inkcoater, which was then rotated for 3 minutes at 1200 rpm. The degree of spattering of the ink onto an art paper placed below the roll was observed.

Drying time:

After applying 0.4 cc. of ink to an art paper with the aforesaid RI tester, the drying time was measured with an ink drying tester.

The result obtained in the foregoing tests are shown in the following table.

| Class of resin | Varnish Viscosity (poise, 25°C.) | Properties of varnish | Luster | Setting time (min) | Drying time (hr) | Misting |
|---|---|---|---|---|---|---|
| (I) | 400 | transparent | 65 | 10 | 5.5 | no |
| (II) | 390 | slightly turbid | 53 | 11 | 6.0 | no |
| (III) | 380 | do. | 55 | 10 | 5.5 | no |
| (IV) | 390 | transparent | 65 | 10 | 5.5 | no |
| (V) | 410 | do. | 66 | 11 | 6.0 | no |
| (VI) | 420 | do. | 64 | 10 | 5.5 | no |
| (VII) | 420 | slightly turbid | 55 | 10 | 6.0 | no |
| Control 1 | 500 | presence of insoluble portions | 35 | 11 | 5.5 | slight |
| do. 2 | 520 | do. | 30 | 11 | 6.0 | do. |
| Reference resin* | 470 | transparent | 59 | 10 | 6.0 | no |

*The reference resin was prepared into a varnish in the following manner. Seventy grams of linseed oil was added to 100 grams of a rosin-modified phenolic resin(Beckacite 1126 made by Dainippon Ink & Chemicals Inc., Japan) followed by heat treating the mixture for 30 minutes and thereafter adding 40 grams of one of the aforementioned petroleum hydrocarbon solvents to prepare the varnish.

What is claimed is:

1. A process for preparing a thermoplastic resin containing polar groups and unsaturated bonds which comprises reacting in the presence or absence of an inert solvent a three-component mixture consisting of (A) at least one compound selected from the group consisting of five-membered cyclic compounds containing unsaturated conjugate double bonds of the formula

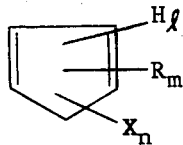

wherein R is an organic residue of 1–24 carbon atoms, X is a halogen, and $l$, $m$ and $n$ are each an integer with the proviso that $l + m + n = 6$, and the Diels-Alder adducts of said five-membered cyclic compounds; (B) at least one compound selected from the group consisting of unsaturated carboxylic acids and the anhydrides thereof in an amount ranging from 0.01 to 0.5 mol per mol of (A), the number of mols of (A) being calculated on the basis of the five-membered ring of (A); and (C) at least one alcohol selected from the group consisting of the monohydric saturated and unsaturated alcohols in an amount ranging from 0.1 to 1.0 mol per equivalent of the carboxyl groups of (B), or in an amount ranging from 0.2 to 2.0 mols per equivalent of the acid anhydride groups when (B) is an acid anhydride.

2. The process of claim 1 wherein components (A) is at least one compound selected from the group consisting of the compounds of said formula wherein R is an alkyl group of 1–6 carbon atoms, $m$ is an integer from 0 to 2, and $n$ is 0 or 1, and the Diels-Alder adducts thereof.

3. The process of claim 1 wherein component (B) is selected from the group consisting of the monovalent and polyvalent unsaturated carboxylic acids of 3–32 carbon atoms and the anhydrides thereof.

4. The process of claim 1 wherein component (C) is selected from the group consisting of saturated and unsaturated monohydric alcohols of 1–24 carbon atoms.

5. The process of claim 4 wherein component (C) is selected from the group consisting of higher monohydric saturated and unsaturated alcohols of 6–24 carbon atoms.

6. The process of claim 1 wherein said (B) is used in an amount of 0.05–0.1 mol per mol of components (A), the number of mols of components (A) being calculated on the basis of the five-membered ring of component (A).

7. The process of claim 6 wherein component (B) is used in an amount of 0.05–0.7 mol per mol of (A).

8. The process of claim 1 wherein component (C) is used in an amount of 0.25–0.8 mol per equivalent of the carboxyl groups of component (B), or in an amount of 0.5–1.0 mol per mol of the acid anhydride groups of component (B), when component (B) is an acid anhydride.

9. The process of claim 1 wherein the reaction is carried out at a temperature of 150°–330°C. without a catalyst.

10. The process of claim 1 wherein the softening point of the resulting resin is 80°–200°C.

11. The process of claim 10 wherein the softening point of the resulting resin is 100°–160°C.

12. The process of claim 9 wherein the reaction is carried out without a catalyst at a temperature of 240° to 300°C.

13. The process of claim 1 wherein component (A) is dicyclopentadiene; component (B) is selected from the group consisting of maleic anhydride, acrylic acid, and tetrahydrophthalic anhydride; component (C) is selected from the group consisting of oleyl alcohol, stearyl alcohol, isodecanol, myristyl alcohol, ethylene glycol and ethylhexanol; and the softening point of the resulting resin is from 120° to 140°C.

* * * * *

UNITED STATES PATENT AND TRADEMARK OFFICE
CERTIFICATE OF CORRECTION

PATENT NO. : 3,957,736
DATED : May 18, 1976
INVENTOR(S) : TSUCHIYA, ET AL.

It is certified that error appears in the above-identified patent and that said Letters Patent are hereby corrected as shown below:

Claim 2, line 1, delete "components", insert -- component --

Claim 6, line 2, delete "components", insert -- component--

Claim 6, line 3, delete "components", insert -- component --

Signed and Sealed this

Tenth Day of August 1976

[SEAL]

Attest:

RUTH C. MASON
Attesting Officer

C. MARSHALL DANN
Commissioner of Patents and Trademarks